United States Patent [19]

Ina

[11] 4,181,473

[45] Jan. 1, 1980

[54] MOTOR PUMP

[75] Inventor: Yoshifumi Ina, Okazaki, Japan

[73] Assignee: Nippondenso Co., Ltd., Kariya, Japan

[21] Appl. No.: 802,532

[22] Filed: Jun. 1, 1977

[30] Foreign Application Priority Data

Jul. 1, 1976 [JP] Japan .................................. 51-78567
Jul. 1, 1976 [JP] Japan .................................. 51-78568

[51] Int. Cl.² ........................................... F04B 17/00
[52] U.S. Cl. .................................... 417/365; 417/366; 417/540
[58] Field of Search ................... 417/365, 366, 423 R, 417/540, 541, 542, 543, 313, 424, 312

[56] References Cited

U.S. PATENT DOCUMENTS

| | | | |
|---|---|---|---|
| 2,472,067 | 6/1949 | Dickey et al. | 417/543 |
| 3,192,864 | 7/1965 | Notte | 417/542 |
| 3,754,844 | 8/1973 | Nusser et al. | 417/423 R |
| 3,836,291 | 9/1974 | Bottcher et al. | 417/423 R |
| 3,870,910 | 3/1975 | Fussner | 417/423 R |
| 3,897,179 | 7/1975 | Fussner | 417/423 R |

FOREIGN PATENT DOCUMENTS 2460748  12/1974  Fed. Rep. of Germany ...... 417/423 R

*Primary Examiner*—Carlton R. Croyle
*Assistant Examiner*—Edward Look
*Attorney, Agent, or Firm*—Cushman, Darby & Cushman

[57]  ABSTRACT

A motor pump comprises a DC motor unit, a pump unit and a cover housing for the motor and pump unit; the motor unit includes a cup-shaped yoke with the bottom having a bearing and a bearing holder fitted into an opening in the cup-shaped yoke to thereby hold an armature shaft of the motor unit in position with respect to the yoke; a compressible silencer is also installed in the cup-shaped yoke adjacent permanent magnets, an armature surface and the yoke.

4 Claims, 17 Drawing Figures

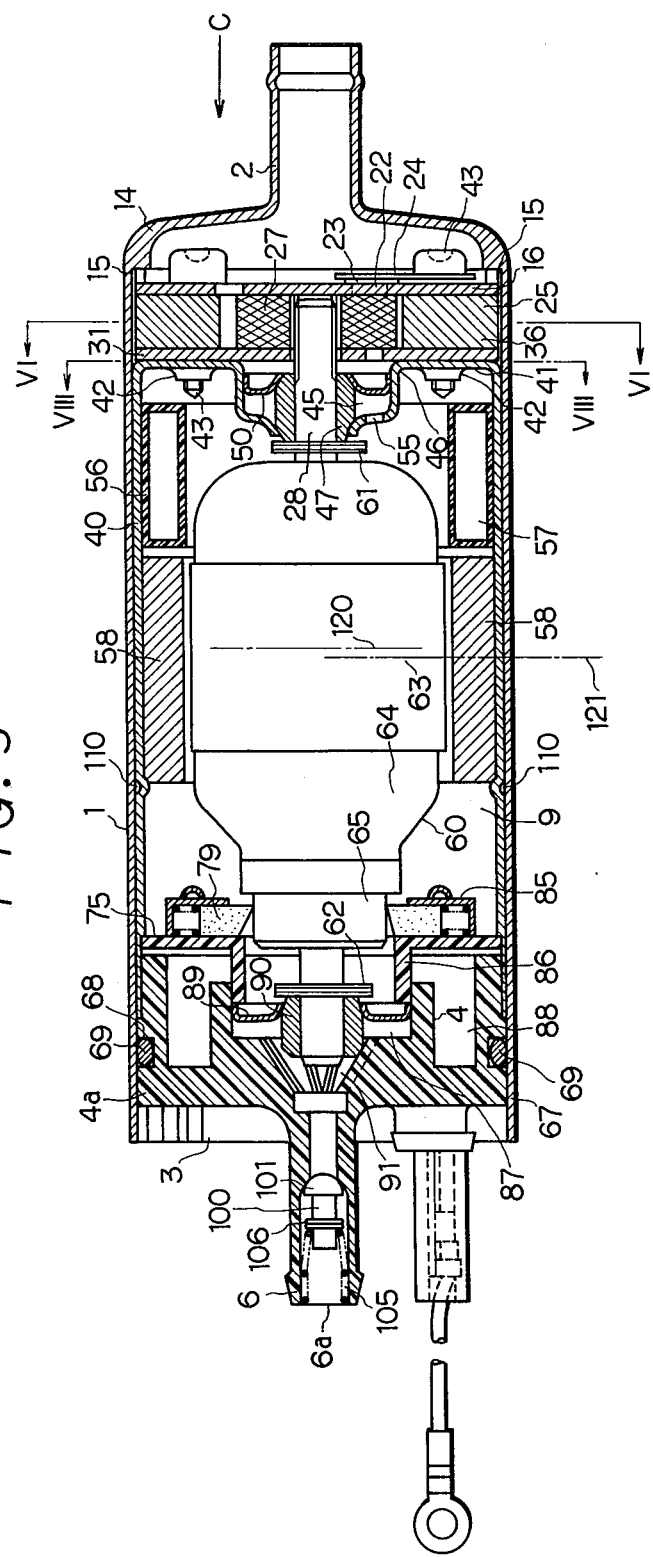

MOTOR PUMP

BACKGROUND OF THE INVENTION

The present invention relates to an improved construction of a motor pump such as a fuel pump for use in electronically controlled fuel injection system (hereinafter referred to as EFI) for an internal combustion engine.

SUMMARY OF THE INVENTION

It is a primary object of the present invention to provide an improved motor pump.

It is another object of the present invention to provide a simple and inexpensive motor pump structure having a silencer installed therein.

It is a further object of the present invention to provide a motor pump in which permanent magnets, an armature and bearings therefor are installed in the cup-shaped yoke to form a motor unit.

Other objects, features and advantages of the present invention will become apparent from the following description.

BRIEF DESCRIPTION OF THE DRAWINGS

FIG. 3 is a sectional view of the embodiment taken on line III—III in FIG. 2,

DETAILED DESCRIPTION OF THE PREFERRED EMBODIMENT

Figure 1:
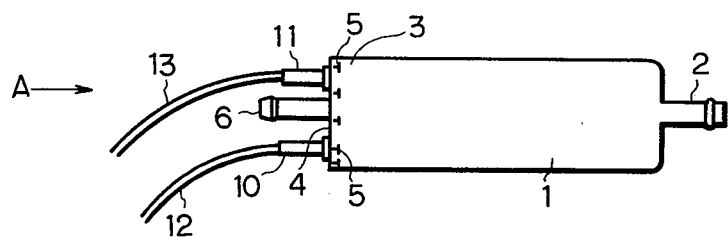
FIG. 1 is a plan view of an embodiment according to the present invention.
Figure 2:
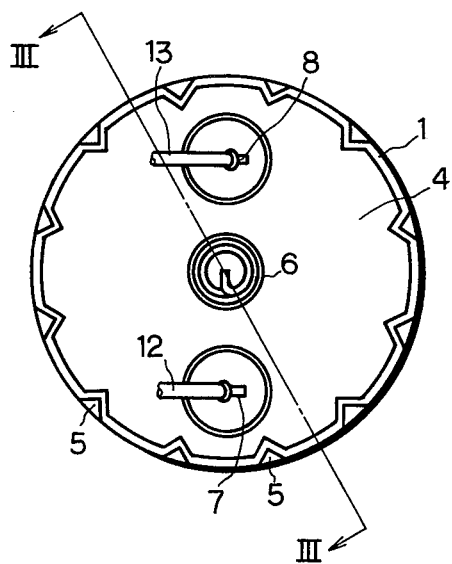
FIG. 2 is a rear view viewed from arrow A of FIG. 1.

An overall construction of a preferred embodiment according to the present invention will be explained with reference to FIGS. 1, 2 and 3.

Figure 4:
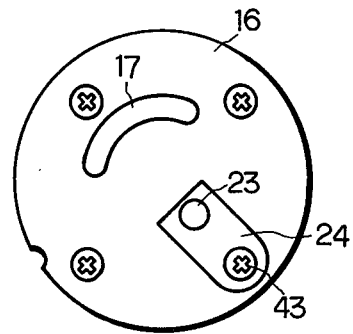
FIG. 4 is a front view of the spacer cover plate of the pump unit viewed from arrow C in FIG. 3.
Figure 5:
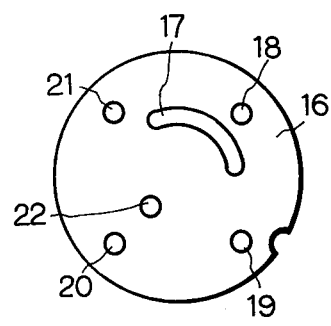
FIG. 5 is a rear view of the spacer cover plate of the pump viewed from the side opposite to arrow C in FIG. 3.
Figure 6:
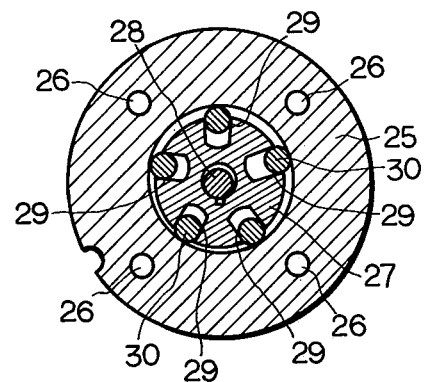
FIG. 6 is a sectional view of the pump taken on line VI—VI in FIG. 3.
Figure 7:
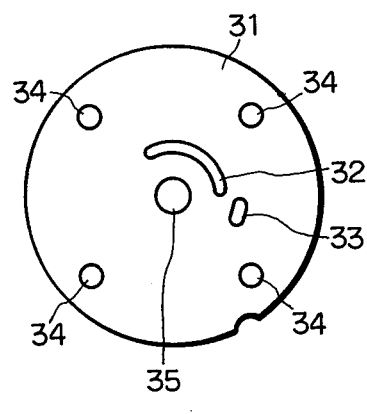
FIG. 7 is a front view of the spacer sheet of the pump viewed from arrow C in FIG. 3.
Figure 8:
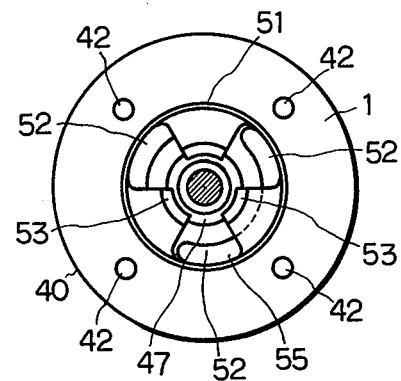
FIG. 8 is a front view of the cup-shaped motor housing taken on line VIII—VIII in FIG. 3.
Figure 9:
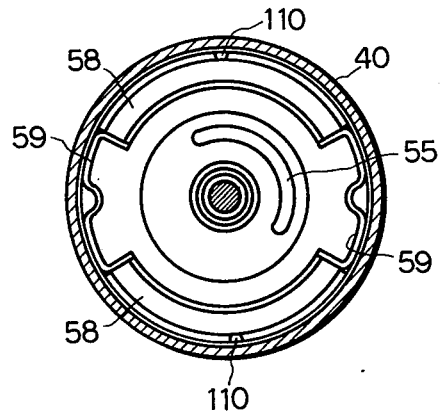
FIG. 9 is a front view of the cup-shaped yoke viewed from the side opposite to arrow C in FIG. 3.
Figure 10:
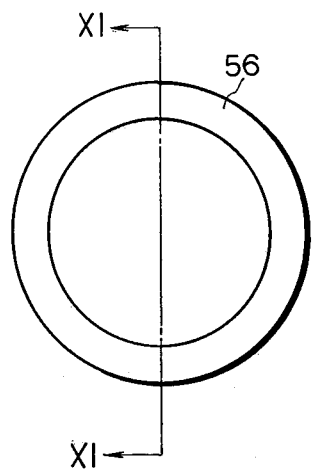
FIG. 10 is a front view of the silencer installed in the motor.
Figure 11:
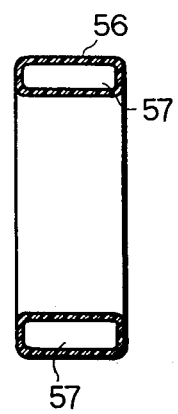
FIG. 11 is a sectional view of the silencer taken on line XI—XI in FIG. 10.
Figure 12:
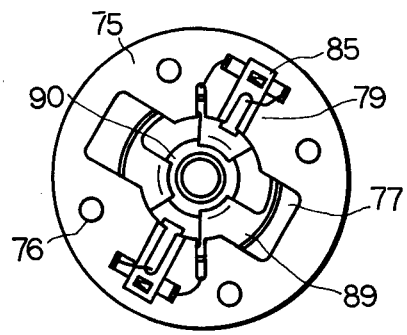
FIG. 12 is a front view of the bearing holder of the pump unit viewed from arrow C in FIG. 3.
Figure 13:
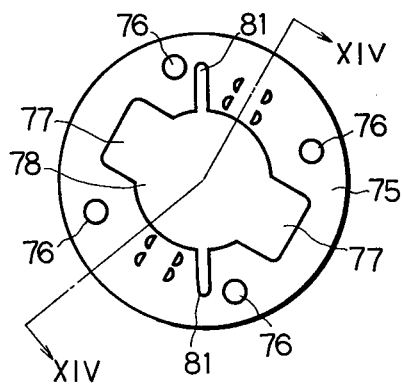
FIG. 13 is a front view of the brush holder plate of the bearing holder of FIG. 12.
Figure 14:
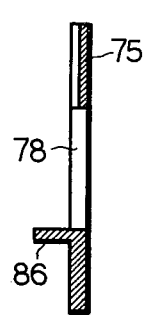
FIG. 14 is a sectional view of the brush holder plate taken on line XIV—XIV in FIG. 13.
Figure 15:
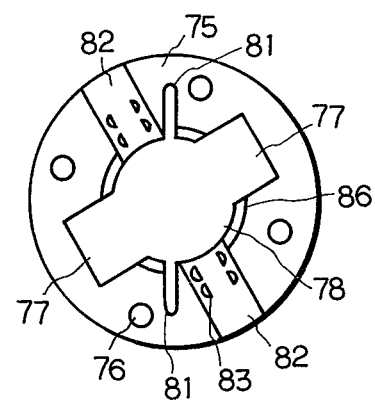
FIG. 15 is a rear view of the brush holder plate shown in FIG. 13.
Figure 16:
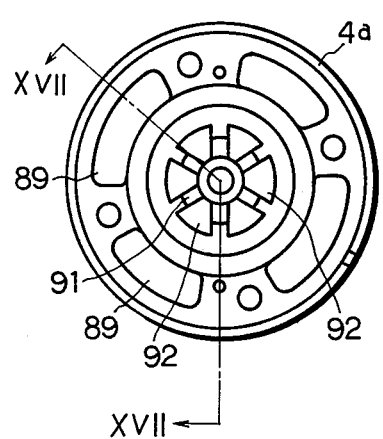
FIG. 16 is a front view of the bearing holder viewed from arrow C in FIG. 3.
Figure 17:
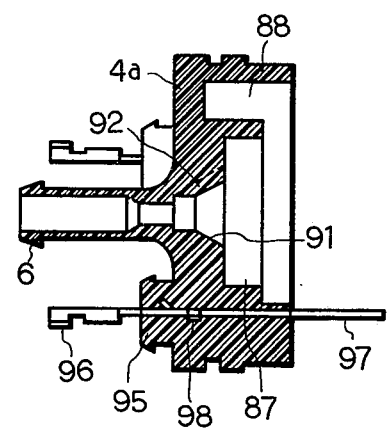
FIG. 17 is a sectional view of the bearing holder taken on line XVII—XVII in FIG. 16.

A housing 1 which is formed by forging of aluminum plate is provided integrally with an inlet pipe 2 at one end and an opening 3 at the other, in which a bearing holder 4 is received and secured by caulking the opening portion 5 surrounding the periphery of the bearing holder 4. Numeral 6 is an outlet pipe formed integral with the bearing holder 4. Numerals 7 and 8 are terminals molded in the bearing holder 4, for energizing a motor unit 9. Numerals 10, 11 are insulating tubes and 12 and 13 are leads connectable with a vehicle battery. The housing 1 is formed with a shoulder portion 14 at the one end on which a rubber cushion 15 of L-shaped section is provided to receive a spacer cover plate 16. The spacer cover plate 16 is formed with an inlet port 17 of an arched groove as shown in FIG. 4 and FIG. 5, four screw holes 18, 19, 20 and 21, and a valve opening 22, to which a resilient metal valve body 24 having sealing member 23 thereon is secured. Numeral 25 is a spacer ring as shown in FIG. 6, 26 screw holes, 27 a pump rotor rotatable within the spacer ring 25 and carried on an armature shaft 28 by means of spline connection. The rotor is formed with a plurality of slits 29 receiving rollers 30 therein. Numeral 31 is a spacer sheet, which is provided with outlet ports 32 and 33, four screw holes 34 and a shaft through-hole 35. Thus, the pump unit is composed of the spacer sheet 31, the rotor 27, the rollers 30, the spacer cover plate 16 and the spacer ring 25. Numeral 40 is a cup-shaped motor housing having a cylindrical yoke portion 9 of high magnetic permeability. The bottom of the motor housing is in contact with the pump unit 36 and is formed with burls 42 which are threaded to have screw bolts therein, thus to fix the spacer cover plate 16, rotor 27, spacer sheet 31 to the motor housing 40. At the central portion of the bottom of the motor housing, a bend is formed to support a bearing 47 of the armature shaft 28. Numeral 50 is a rocking washer which has outer periphery fixed to the motor housing 40 and has windows 52 and tongues 53 for holding the bearing as shown in FIG. 8. The bottom portion of the motor housing is also formed with an arched opening 55. Numeral 56 is a silencer with the outer periphery fixed to the inner surface of the motor housing. The silencer 56 is an annular hollow casing made of elastic material as shown in FIG. 10 and FIG. 11. Numeral 58 is permanent magnets fixed to the inner surface of the motor housing 40 between projections 110 formed on the cylindrical yoke portion in parallel with the silencer by means of springs 59 interposed therebetween as shown in FIG. 9. Numeral 60 is an armature, 61 and 62 are thrust washers, 63 a core which is a lamination of a plurality of iron sheets, 64 an armature winding, and 65 a commutator. The bearing holder 4 is provided with an annular groove 68 at the outer periphery in which an O-ring 69 is inserted to ensure sealing effect. The bearing holder 4 comprises a brush holder plate 75 shown in FIGS. 12 through 15 and a base member 4a shown in FIG. 16 and or FIG. 17. The brush holder plate 75 is formed with screw holes 76, openings 77 through which fuel passes, an opening 78 through which the commutator extends and slits through which lead wires extend. The brush holder plate 75 is further provided with shallow recesses 82 at the side opposite to brushes 79 in which eight holes are provided for receiving nails of brush holders 85 to fix the brush holders 85 to the brush holder plate 75. Numeral 86 is an arm extending from the brush holder plate 75 to fit in an annular hollow portion 87. Hollow portion 88 is formed for saving of material. To the annular hollow portion 87, a rocking washer 89 and a bearing 90 are fixed. The bearing 90 has a conical portion in contact with the center portion 91 of the base member 4a of the bearing holder 4 which is also conical. Around the center portion 91, a plurality of radially disposed grooves for fuel passage. Numeral 95 designates a bulge formed integral with the bearing holder 4 through which a terminal 96 extends as shown in FIG. 17. A lead wire 97 which is connected with the brush at one end is connected with the terminal at the junction 98 which is molded in the bearing holder 4. Numeral 100 is a valve body of a check valve, 105 a stopper for holding the periphery of the valve body 100 within the outlet tube 6.

In operation, when the armature shaft 28 is energized through the terminals 7, brushes 79, it rotates along with the pump rotor 27. The rotor 27 with its rollers operates as a roller pump in a known manner to suck fuel from the inlet tube 2 through the inlet port 17 of the spacer cover 16 to fill the space between the rotor 27 and the spacer ring 25, and send it through the outlet ports 32 and 33 to the space 45 between the pump unit 36 and the motor housing 36. The fuel past the space 45 cools the bearing 47 and through the openings 55 flows to fill in the inside of the motor housing 40. Thereafter, it fills in the hollow portion 87 through the openings 77 of the brush holder plate 75, cools the bearing 90, pushes the check valve 100 and flows out of the outlet tube 6a. The fuel is, thereafter, delivered to a suction manifold of an internal combustion engine.

When the fuel pressure at the outlet port 32 or in the motor housing 40 increases and exceeds a preset value, e.g. 5 atms, the valve sheet 24 is lifted so that the fuel flows back to the inlet side of the pump unit, thereby regulating the fuel pressure.

When the fuel pressure increases or decreases within the preset value, the silencer 56 contracts or expands to smooth the supplied fuel pressure.

The check valve 100 operates to keep the pressure in the fuel supply system after the pump stops.

In manufacture of the pump according to the present invention, the magnets 58 are inserted forward into the cylindrical yoke portion 9 between the projections 110 on the front side until the magnet end abuts on the other projections 110 (not shown) on the rear side and the springs 59 are set between the magnets 58. Thereafter, the magnets are rotated about 90° in angle to be in position between the front and rear projections 110. In the above embodiment, two projections are formed circumferentially on the motor housing in the front side and four are formed in the rear side.

As shown in FIG. 3, the magnets are positioned so that the center line 121 thereof is shifted from the center line 120 of the armature core to provide a magnetic force in the axial direction. As a result, thrusting force exerted on the bearing and the washer due to the pressure difference between the both shaft ends one of which is located in the pump inlet side and the other of which is in the pump outlet side may be cancelled or reduced, thereby improving life of the bearing.

The present invention has been explained with reference to a EFI motor pump, however the motor pump other than EFI may be useful. Of course, the pump unit may comprise vane pump, trochoid gear pump or other type.

What is claimed is:
1. A motor pump comprising:
   a motor unit including an outer housing and a cup-shaped ferromagnetic motor housing with a bottom having a first bearing, a permanent magnet secured to said motor housing, an armature with a shaft carried by said bearing and meams including a first port member for communicating the inside of the motor housing with the outside thereof and a second bearing for carrying said shaft at the side opposite to said first bearing, said means being secured to the open end of said motor housing so that said motor unit is operable independently of said outer housing,
   a pump unit including a rotor rotatable with said shaft and a stator secured to the bottom of said motor housing, said stator having a fluid inlet port and a fluid outlet port, said pump unit being in fluid communication with the inside of said motor housing through one of said fluid inlet and outlet ports; and
   said outer housing encasing said motor unit and pump unit and including a second port member formed integral therewith to communicate the other of said fluid inlet and outlet ports with the outside whereby said first port member, the inside of said motor housing, said pump unit and said second port member are in series fluid communication.

2. A motor pump comprising:
   a motor unit including a cylindrical cup-shaped ferromagnetic motor housing with the bottom having a first bearing, a permanent magnet secured to said motor housing, an armature having an integral shaft carried by said bearing and means having an outlet tube in communication with the inside of said motor housing and a second bearing, said means being secured to the cylindrical open end of said motor housing at the periphery thereof so that said motor unit is operable independently of an outer housing;
   a pump unit including a rotor connected to said shaft and a stator secured in contact to the bottom of said motor housing, said stator having a fluid inlet and a fluid outlet, said fluid outlet being in fluid communication with the inside of said motor housing; and
   an outer housing for encasing said motor unit and pump unit, said outer housing including an integral inlet tube in fluid communication with said fluid inlet of said pump unit whereby all the fluid flows from said inlet tube through the inside of said motor housing to said outlet tube.

3. A motor pump according to claim 2, wherein said motor unit further comprises an expansible annular hollow casing secured within said motor housing between the side surface of said permanent magnet and the outer surface of said armature.

4. A motor pump according to claim 3, wherein said magnet and said armature are disposed such that said armature is urged by magnetic force to said second bearing.

* * * * *